Dec. 27, 1966   W. V. FIORE   3,295,083
APPARATUS COMPRISING A WOUND ROTOR AND A ROTOR
HOUSING AND BEARING STRUCTURE
Filed May 1, 1963
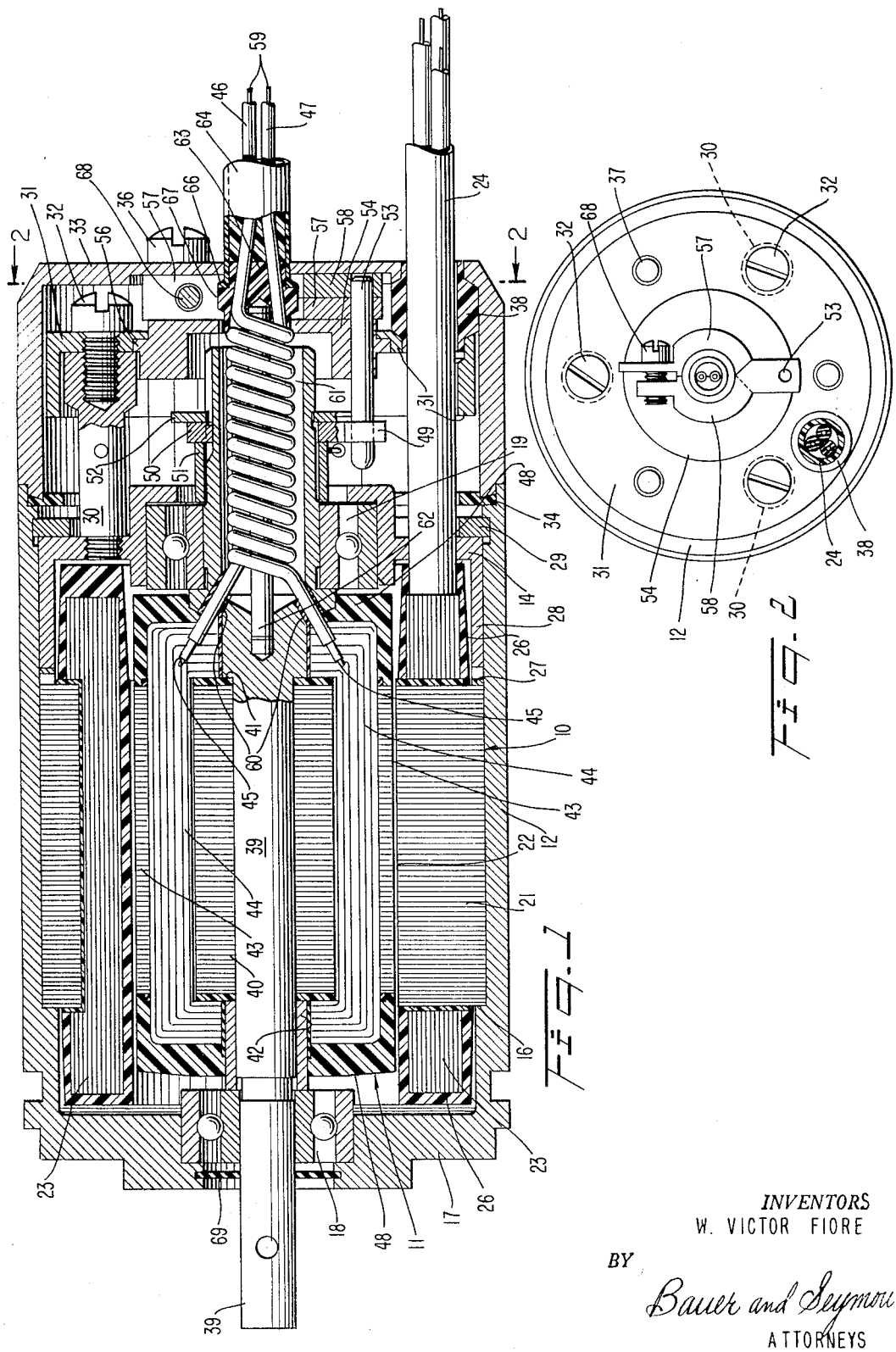
INVENTORS
W. VICTOR FIORE
BY
Bauer and Seymour
ATTORNEYS

3,295,083
APPARATUS COMPRISING A WOUND ROTOR AND A ROTOR HOUSING AND BEARING STRUCTURE
William Victor Fiore, Montrose, Pa., assignor to The Bendix Corporation, South Montrose, Pa., a corporation of Delaware
Filed May 1, 1963, Ser. No. 277,242
17 Claims. (Cl. 336—30)

This invention relates to electrical apparatus and more particularly to electrical devices having movable windings, such as transformers or the like known in the art as synchros for converting electrical energy to mechanical motion or vice versa.

It is an object of the present invention to provide a novel apparatus of the above character which may be operated immersed in liquid fuel, such as in the fuel tank of an aircraft, without danger of fire or malfunction.

Another object of the invention is to provide a novel structure wherein the terminals of a movable winding within a casing are connected to stationary leads in a novel manner without exposed joints or contacts, slip rings or the like.

A further object is to provide an assembly of parts which is novelly constructed to insure proper transverse or radial alignment of a bearing for a rotor substantially independently of manufacturing tolerances.

Still another object is to provide a novelly constructed synchro adapted for use as a control transformer, transmitter or receiver in a synchronous transmission system.

A still further object is to provide novel means in apparatus of the above type for adjustably limiting the movements of a movable winding and for biasing the latter toward a null position.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a sectional view of one type of electrical apparatus embodying the present invention; and FIG. 2 is an end view, on a reduced scale, taken substantially on line 2—2 of FIG. 1 with the end cover removed.

The single embodiment of the invention, illustrated by way of example in the drawings, is in the form of a so-called synchro or electrical transformer comprising relatively movable windings whereby electrical energy may be converted to proportional mechanical motion or vice versa. Devices of this general type are well known in the art and are widely used for transmitting and receiving electrical signals which are generated by or converted to mechanical motion of proportional magnitude. The present invention contemplates structural improvements whereby accurate bearing alignment is achieved and all exposed or bare wire contacts and connections in the form of solder connections, slip rings, brushes and the like are successfully eliminated without introducing appreciable interferences with the desired relative movement of the windings.

In the form shown in the drawings, the invention is embodied in a synchro or synchronous transformer comprising a stator assembly 10 and a rotor assembly 11, both of which have the windings thereof encapsulated or embedded in an electrically insulating compound which is preferably adapted to resist temperatures up to at least 450° F. These assemblies or parts are mounted and secured in a hollow casing 12 in a novel manner which assures proper alignment for the rotor bearings and compensates for axial tolerances. Said casing has a circular differential bore providing an annular shoulder or stop 16, an integral end wall 17 fitted with a bearing 18 and a bearing plate 14 constituting the other end wall and support for a bearing 19.

Stator assembly 10 comprises a stack 21 of ring-like laminations which are internally radially slotted in a known manner to provide spaced pole faces 22 and for receiving a plurality of coil windings 23 mounted and connected as a three phase, Y-connected distributed winding. The end terminals of the windings are connected to the conductors of a cable 24 through which the windings may be energized. The stator windings 23, including the connections to cable 24, are impregnated and embedded in a suitable high temperature resistant compound 26. The stator assembly has a sliding fit in casing member 12 and the outer periphery of one end of the stack of laminations 21 abuts shoulder or stop 16. At the other end, the stator assembly is held against axial movement by suitable resilient means such as an annular wavy leaf spring 27 interposed between the rigid lamination stack 21 and an annular flange 28 on bearing support 14 to compensate for and permit relatively wide manufacturing tolerances. Bearing plate 14 is secured in place by a snap ring 29 and is maintained in firm engagement therewith by spring 27 to assure bearing alignment by novel means to be hereinafter described.

A plurality of studs 30, three being shown, are threaded into bearing plate 14 and project therefrom to support a plate 31 in spaced relation thereto. Plate 31 may be secured to studs 30 by any suitable means, such as bolts 32. The open end of a hollow cover 33 abuts the open end of stator casing member 12 and has a reduced portion which is piloted in the casing member and engages a sealing gasket 34. Cover 33 is secured in position by a plurality of bolts 36 which extend freely therethrough and engage threaded openings 37 (FIG. 2) in plate 31. Thus, when bolts 36 are tightened, the plate 31 and bearing plate 14 through studs 30 are urged to the right relative to casing member 12 and cover 33. Bearing plate 14 is thus held firmly at its periphery against retaining ring 29 to assure proper alignment of bearing 19 transversely of or perpendicular to the rotor axis.

Plate 31 and cover 33 have aligned openings through which cable 24 is passed. A grommet 38 of yieldable material surrounds the cable between bevelled surfaces on said plate and cover so that the grommet is compressed into sealing relation with the cable when cover fastening screws 36 are tightened.

Rotor 11 in the form illustrated comprises a shaft 39 rotatably supported by bearings 18 and 19 and having a stack of laminations 40 secured thereon between a shoulder 41 and a pressed-on collar 42. Laminations 40 are externally radially slotted in a known manner to provide circumferentially spaced pole faces 43 to cooperate in a known manner with the pole faces 22 on the stator assembly and to further provide slots for receiving a coil winding 44. The terminal ends of the latter are soldered or otherwise suitably connected to two external leads 46, 47 which are led from a suitable voltage source into the rotor in a novel manner to be hereinafter described in detail. The rotor coil winding 44, including the connections 45 thereof to conductors 46, 47, is impregnated and embedded in a high temperature resistant compound 48. The connections between the incoming leads and the coil windings of both the stator assembly and rotor may be, and preferably are, covered with insulating sleeves or the equivalent before molding the embedding or encapsulating compound in place around the windings and within the slots of the lamination stacks.

Means are provided in the illustrated construction for limiting the rotation or angular movement of rotor 11 to something less than one complete revolution relative to the stator assembly. As shown, said means comprises an arm 49 which extends radially from a ring 50 keyed to rotor shaft 39 for angular movement therewith. A collar 51 spaces said ring from the inner race of bearing 19 and a snap ring 52 holds it on the shaft. To limit the angular movement of rotor 11 in both directions, arm 49 is adapted to engage opposed sides of a pin 53 that has a press fit in an off-center opening through ring 54 that is piloted in a central opening in plate 31. A peripheral flange 56 on ring 54 is clamped between plate 31 and enlarged portions of studs 30 to adjustably determine the angular position of stop pin 53. The outer end of the stop pin also functions as a pivotal support for the two parts 57, 58 of a split clamp, the purpose and construction of which will be hereinafter described.

In some environments in which synchros of the type disclosed are used, it is detrimental if not prohibitive to utilize exposed electrical connections or terminals of any kind. For example, it has been found desirable to use these devices inside a tank immersed in a combustible liquid fuel. Novel means are accordingly contemplated by the present invention for effecting external electrical connections to the coil winding 44 of the movable rotor 11. In the form shown said means comprises the pair of leads 46, 47 made of spring wire conductors 59 and an insulating coating. Each conductor is preferably made of a plurality of twisted strands of drawn beryllium-copper wire. An extruded Teflon coating is suitable for insulating these conductors and is desirable when high temperatures are apt to be encountered.

As pointed out above, the inner ends of conductors or leads 46, 47 are soldered or otherwise suitably connected to the ends of the rotor coil winding, suitably insulated and embedded in insulating compound 48. From the soldered connections the insulated conductors are led through openings 60 into the hollow interior 61 of an end portion of the rotor shaft 39. Leads 46, 47 have a tight fit in holes 60, or the latter may be tapered and sealed around the leads, such as with a Teflon sleeve, a suitable baked potting compound or the like to prevent any of the rotor encapsulating compound 48 from entering the space 61 in the shaft during the molding process. The end portions of the leads are thus effectively secured to the rotor to rotate therewith. Within the hollow interior of shaft 39 the leads 46, 47 are formed into coils, preferably loosely, around a pin 62, the inner or left end of which is press fitted or otherwise suitably secured in a centrally located recess in the solid portion of the shaft. This pin which is in effect a part of the rotor serves to support the coiled leads against excessive sagging in a near central or axial position. The coiled portions of wires 46, 47 function as a torsion spring and permit limited rotation of the rotor without resultant early fatigue or fracture of the wires. The rotor may be normally yieldably held in a null or zero position with arm 49 in engagement with or in predetermined spaced relation to pin 53 by the spring action of the coiled leads.

To prevent rotation of the leads 46, 47 outside of the housing 12, 33 the same are individually led through eccentric openings in a grommet 63 which may be of yieldable Teflon or other suitable material and centrally counter-bored to receive the free end of pin 62. Beyond the grommet, the leads are preferably sheathed in a Teflon or similar tube 64, the end of which fits tightly over the reduced outer end of grommet 63 and has a tapered external flange 66 which complements a flange 67 on the grommet. The two halves of clamp 57, 58 are internally grooved to receive the complementary flanges 66, 67. When the clamp is closed by means of a screw 68, the grommet 63 is compressed around the insulated leads 46, 47 and holds the same against rotation while at the same time sealing the end of tube 64 against an end portion of the grommet.

Tube 64 and the projection of grommet 63 therein preferably have a tight fit in the surrounding opening in cover 33 to effect a low pressure seal. A suitable low pressure seal 69 is also provided around shaft 39 at the other end of the casing. Thus, when the device is immersed in a liquid fuel under pressure, the seals will not prevent entrance of the fuel to fill the casing 12, 33 but will prevent circulation of fuel through the casing. The fuel functions as a lubricant for the moving parts and the entrance of dirt, salt water and other contaminants which may get into the fuel tank is avoided by reason of the fact that fuel is not permitted freedom of circulation through the device. The seals may be designed to withstand a pressure greater than the expected external pressure and the casing may be filled with fluid at a somewhat higher pressure to insure against circulation.

There is thus provided a novelly constructed electrical device embodying stationary and movable windings which will operate safely and accurately immersed in a combustible liquid under substantial pressure over a wide range of temperatures. The novel construction eliminates all bare electrical connections or joints within the device, permits easy adjustment for positioning the rotor assembly and provides greater assurance of accurate transverse alignment of the rotor bearing in a novel manner. Additionally, the device is so constructed as to permit filling thereof with a lubricating liquid while preventing circulation therethrough to thus guard against contamination of the working parts by dirt, salt water and the like. The device contemplated by the invention is also of simple construction, yet rugged and capable of long operating life under adverse conditions.

Although only a single embodiment of the invention has been illustrated in the drawings and described in the foregoing specification, it is to be expressly understood that the invention is not limited thereto. For example, various changes may be made in the materials specified or illustrated and changes may be made in the specific design and arrangement of many of the parts without departing from the spirit and scope of the invention. For a definition of the limits of the invention reference is had to the accompanying claims.

What is claimed is:

1. Electrical apparatus comprising a casing, a rotor mounted in the casing and comprising a winding, means including a bearing for supporting the rotor, electrically conductive, insulated leads connected to said winding and extending through said bearing within the rotor, and means for securing said leads intermediate the ends thereof against movement relative to the casing at a position spaced from said winding, said leads being formed into coils about the axis of and within the rotor between said winding and said position and each said lead being a continuous unitary wire.

2. Electrical apparatus as defined in claim 1 wherein said coils comprise spring wire and torsionally bias the rotor toward a limiting position.

3. Electrical apparatus as defined in claim 2 comprising stop means for limiting angular movement of the rotor, and common means for simultaneously and equally adjusting said stop means and said means for securing the leads angularly about the axis of the rotor.

4. Electrical apparatus comprising a hollow casing, a stator assembly axially slidable into the casing against a stop in the latter, a bearing support axially slidable into said casing, a snap ring engaging a groove in the casing wall and resilient means interposed between said stator assembly and said support for urging said assembly and support against said stop and the inner face of said ring, respectively, means for holding said support firmly against said ring, a rotor within the stator, bearings in said casing and support for the rotor, a winding on the rotor, leads connected to the terminals of said winding and extending through the wall of the rotor into a hollow end portion thereof, and means for fixing said leads intermediate the ends thereof against movement relative to the casing at a position spaced from the winding, said leads being continuous flexible wires formed into coils between said position and the winding.

5. In apparatus of the class described, a casing, a rotor mounted in said casing and comprising a winding, a pair of continuous unitary wire leads constituting torsion spring means connected at one end directly to the rotor winding, means comprising pivotally mounted clamping elements for anchoring said leads intermediate the ends thereof to the casing, and stop means for limiting the angular movement of said rotor, said anchoring means and said stop means being mounted for simultaneous angular adjustment about the rotor axis relative to the casing.

6. Apparatus as defined in claim 5 wherein said anchoring means comprises a resilient grommet having openings through which said leads extend and the grommet is clamped around the leads by said clamping elements.

7. Apparatus as defined in claim 6 comprising a conduit surrounding said leads and receiving an end portion of said grommet, the end of said conduit being clamped in sealing engagement around said grommet by said clamping elements.

8. Apparatus comprising a hollow casing, a bearing support axially slidable into an open end of said casing, positioning means removably mounted on the casing to hold the support against removal through said open end of the casing and to position the same in the casing, means for pulling said bearing support outwardly relative to and toward the open end of the casing to hold the support firmly against said positioning means, and rigid stator means axially slidable into said casing, a stop in the casing, and resilient means interposed between said bearing support and stop to position said rigid stator means axially in the casing.

9. Apparatus as defined in claim 8 wherein said resilient means comprises an annular wavy leaf spring interposed between said bearing support and said stator means to urge the latter against the stop.

10. Electrical apparatus comprising a casing having an opening therein concentric with the longitudinal axis of the casing, a resilient grommet projecting through said opening, insulated electrical conductors extending through said grommet, a conduit around said conductors extending through said opening and having a close fit therein around said grommet, clamping means for squeezing said conduit around the grommet and the latter around said insulated conductors, and means for mounting said clamping means on the casing for pivotal movement about an axis parallel to and spaced from said longitudinal axis to prevent relative rotation of said casing and the clamped portion of the conductors about said longitudinal axis.

11. Electrical apparatus comprising a casing having an opening therein concentric with the longitudinal axis of the casing, a resilient grommet projecting through said opening, insulated electrical conductors extending through said grommet, a conduit around said conductors extending through said opening and having a close fit therein around said grommet, clamping means for squeezing said conduit around the grommet and the latter around said insulated conductors, means for anchoring said clamping means to the casing to prevent relative rotation of said casing and the clamped portion of the conductors about said axis, and a rotor mounted in said casing and having a winding, and a bearing for said rotor, said conductors being continuous unitary wires extending through said bearing and being directly electrically connected to the terminals of said winding.

12. Electrical apparatus as defined in claim 11 wherein said conductors include spring wire and are formed into coils having turns of approximately equal diameter in axial alignment about the axis of the rotor between said grommet and said winding to constitute torsion springs to angularly bias the rotor.

13. Electrical apparatus comprising a casing enclosing a rotor supported for rotation therein, means limiting the extent of rotation of the rotor, said rotor having an axial recess therein opening through one end, a pair of unitary spring wire electrical conductors secured at one end to the rotor and connecting it to an electrical connection outside the casing, said conductors extending through and out the open end of the recess and through a portion of the casing wall in axial alignment with the recess, and means holding said conductors in fixed position through said portion of the casing wall, a portion of each conductor between its connection to the rotor and the casing wall being coiled axially along an axis approximately coinciding with the axis of rotation of the rotor, whereby the rotor is angularly biased.

14. Electrical apparatus, such as a synchro, adapted for operation immersed in a combustible liquid comprising a closed casing, a stator and a rotor supported for rotation relative to the stator in the casing, stop means limiting the extent of rotation of the rotor, and a pair of electrical conductors secured to the rotor and passing out of the casing to an electrical connection outside, each of said conductors passing through a seal element mounted in a wall of the casing at a point in axial alignment with the rotor and being fixed in position against rotation at said point, a portion of each conductor between its connection to the rotor and said point being coiled along and about an axis approximately coinciding with the axis of rotation of the rotor, said seal element being adapted to permit restricted entry into the casing of liquid in which the apparatus is immersed.

15. Electrical apparatus of the type described, comprising a casing, a stator mounted in the casing, a rotor supported in the casing for rotation relative to the stator, stop means limiting rotation of the rotor to less than one complete revolution, said rotor having an axial recess therein opening through one end of the rotor inside the casing, a pair of unitary insulated spring wire electrical conductors connected to the rotor and connecting it to an electrical connection outside the casing, said conductors extending from the points of connection thereof to the rotor into the inner end of and through said recess and passing from said open end of the recess through an opening in the casing in axial alignment with the recess, and seal means in said opening engaging and holding said conductors against rotation relative to the casing at said opening, a portion of each conductor between its entry into the inner end of said recess and said seal means being coiled along and around an axis approximately coinciding with the axis of rotation of the rotor, said stator and said rotor with the connections of the conductors thereto each being impregnated with an insulating compound.

16. The electrical apparatus of claim 1 including a pin supported within the rotor in axial alignment with the rotor axis, the coiled portions of the leads being loosely coiled around said pin.

17. Apparatus comprising a hollow casing, a bearing support axially slidable into an open end of said casing, a snap ring removably mounted in an annular internal groove in the wall of said casing, said ring being engageable by said support to hold the latter against removal from the casing through said open end thereof and to position the support in the casing, a cover for said open end of the casing having abutting end-to-end engagement with the casing, and bolts threadedly engaging tapped openings in said support and engaging said cover to urge the cover against the casing and the support against said ring in opposite directions.

References Cited by the Examiner

UNITED STATES PATENTS

| | | | |
|---|---|---|---|
| 1,246,171 | 11/1917 | Sieber | 336—120 X |
| 2,624,783 | 1/1953 | Hedzel | 336—123 X |
| 2,883,634 | 4/1959 | Origoni et al. | 336—120 |
| 3,009,983 | 11/1961 | Oppel | 174—12 |
| 3,043,903 | 7/1962 | Keane et al. | 310—71 X |
| 3,059,283 | 10/1962 | Budovec et al. | 174—151 X |
| 3,077,515 | 2/1963 | Divers | 174—151 |

LEWIS H. MYERS, *Primary Examiner.*

JOHN F. BURNS, LARAMIE E. ASKIN, *Examiners.*

D. J. BADER, *Assistant Examiner.*